US008126001B2

(12) United States Patent
Hwang et al.

(10) Patent No.: US 8,126,001 B2
(45) Date of Patent: Feb. 28, 2012

(54) METHOD AND APPARATUS FOR MULTICASTING CONTENTS BETWEEN DEVICES IN NETWORKS

(75) Inventors: Tae in Hwang, Daejeon (KR); Ho Jin Park, Daejeon (KR); Hae Ryong Lee, Daejeon (KR); Kwang Roh Park, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 272 days.

(21) Appl. No.: 12/490,692

(22) Filed: Jun. 24, 2009

(65) Prior Publication Data

US 2010/0135296 A1    Jun. 3, 2010

(30) Foreign Application Priority Data

Dec. 1, 2008  (KR) ......................... 10-2008-0120797
Mar. 13, 2009  (KR) ......................... 10-2009-0021557

(51) Int. Cl.
| | |
|---|---|
| *H04L 12/28* | (2006.01) |
| *H04L 12/56* | (2006.01) |
| *H04L 1/00* | (2006.01) |
| *H04L 12/26* | (2006.01) |
| *H04J 3/16* | (2006.01) |
| *H04J 3/22* | (2006.01) |

(52) U.S. Cl. ... 370/401; 370/230; 370/392; 370/395.53; 370/466

(58) Field of Classification Search .................. 370/390, 370/401; 709/200, 226, 238
See application file for complete search history.

(56) References Cited

U.S. PATENT DOCUMENTS

| 7,159,005 | B1 * | 1/2007 | Baber et al. ................... 709/200 |
|---|---|---|---|
| 7,197,565 | B2 * | 3/2007 | Abdelaziz et al. ............ 709/226 |
| 7,395,536 | B2 * | 7/2008 | Verbeke et al. ............... 718/100 |
| 7,574,523 | B2 * | 8/2009 | Traversat et al. ............. 709/238 |
| 7,774,495 | B2 * | 8/2010 | Pabla et al. ................... 709/238 |
| 2003/0214955 | A1 | 11/2003 | Kim |
| 2005/0111486 | A1 | 5/2005 | Lee et al. |
| 2005/0160172 | A1 | 7/2005 | Eytchison |

(Continued)

FOREIGN PATENT DOCUMENTS

KR    1020030088723 A    11/2003

(Continued)

OTHER PUBLICATIONS

Kim et al. (Implementation of the DLNA Proxy System for Sharing Home Media contents, IEEE 2007).*
Ludmila Cherkasova, et al; "*FastReplica*: Efficient Large File Distribution within Content Delivery Networks", USITS 2003, 2003.
Jangwon Lee, et al; "On Application-level Load Balancing in FastReplica", Computer Communications, vol. 30, 2007.

(Continued)

*Primary Examiner* — Ronald Abelson
(74) *Attorney, Agent, or Firm* — Ladas & Parry LLP

(57) ABSTRACT

An apparatus for multicasting contents between devices in different networks includes: a home-to-home multicast control device for finding the devices in the networks, downloading contents from a device in a network to which the home-to-home multicast control device belongs, processing the contents to generate file blocks, each file block having chunk files, and multicasting the processed contents to the devices in the networks; and at least one home-to-home multicast bridge device for receiving the contents transmitted from the home-to-home multicast control device and streaming the contents to one or more devices in a network to which the home-to-home multicast bridge device belongs. The apparatus further includes a multicast relay device for relaying the contents between the home-to-home multicast control device and the home-to-home multicast bridge device.

18 Claims, 4 Drawing Sheets

U.S. PATENT DOCUMENTS

| | | |
|---|---|---|
| 2006/0037036 A1 | 2/2006 | Min et al. |
| 2006/0230130 A1 | 10/2006 | Cho et al. |
| 2006/0245403 A1 | 11/2006 | Kumar |
| 2007/0005788 A1 | 1/2007 | Kim et al. |

FOREIGN PATENT DOCUMENTS

| | | |
|---|---|---|
| KR | 1020040005503 A | 1/2004 |
| KR | 1020050029421 A | 3/2005 |
| KR | 1020050050954 A | 6/2005 |
| KR | 1020060125440 A | 12/2006 |

OTHER PUBLICATIONS

Gertjan Bogers "UpnP-JXTA Bridging", TU/e Master Thesis, 2004.

HyunRyong Lee, et al; "A Proxy Technique for Media Content Sharing among UpnP-enabled Home Networks", Proc. of SPIE, vol. 6015, 2005.

Dong Hee Kim, et al; "A UpnP Proxy System for the Remote Control of Home Appliances", Journal of KISS, vol. 10, No. 4, 2004.

* cited by examiner

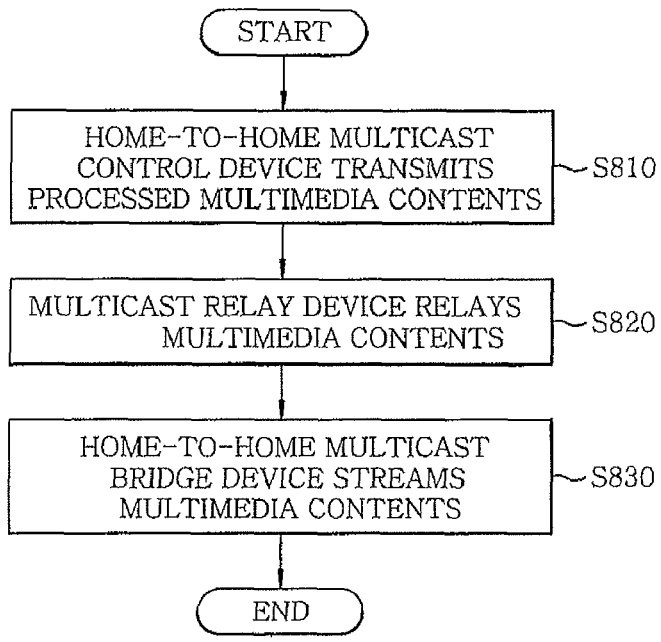
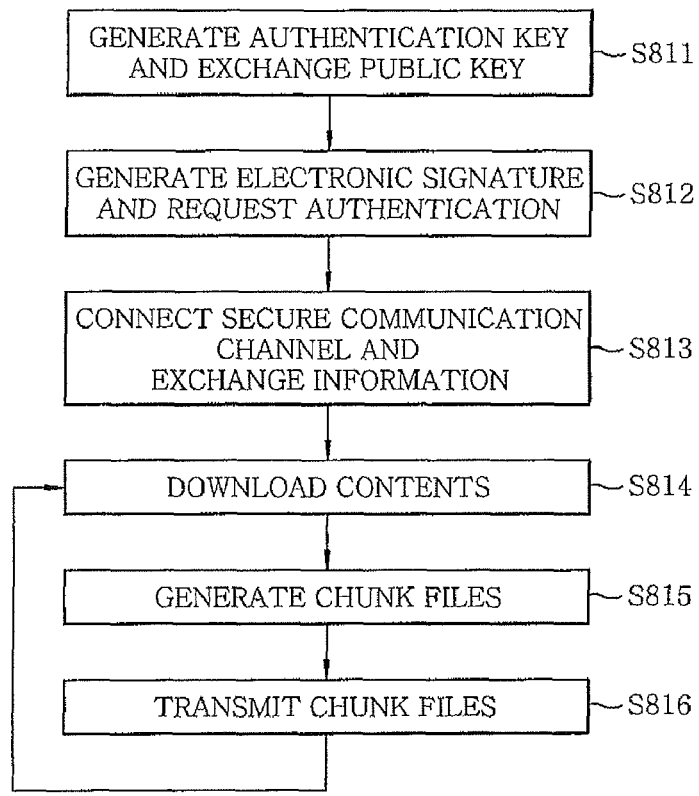

METHOD AND APPARATUS FOR MULTICASTING CONTENTS BETWEEN DEVICES IN NETWORKS

CROSS-REFERENCE TO RELATED APPLICATION(S)

The present invention claims priority of Korean Patent Application No. 10-2008-0120797, filed on Dec. 1, 2008, and Korean Patent Application No. 10-2009-0021557, filed on Mar. 13, 2009, which are incorporated herein by reference.

FIELD OF THE INVENTION

The present invention relates to a method and apparatus for multicasting contents between devices in networks; and, more particularly, to a method and apparatus for securely multicasting contents between general-purpose network devices in different home networks connected to the Internet.

BACKGROUND OF THE INVENTION

Conventional UPnP (universal plug and play) proxy is for allowing an Internet user to find and control in-home UPnP devices at a remote place via the UPnP proxy embedded in a home gateway or a home server. The UPnP proxy provides a unidirectional access and control to the in-home devices from the external Internet, but fails to provide bidirectional access and control between UPnP devices in physically spaced heterogeneous UPnP networks and does not provide steaming services between UPnP A/V devices. Moreover, the UPnP proxy does not allow simultaneous and secure multicasting of contents to UPnP media devices in different UPnP networks.

Interconnection of heterogeneous UPnP networks using JXTA (Juxtapose) protocol is to transmit multimedia data between UPnP media devices based on a relay service, which is the core function of JXTA. However, such interconnection uses multiple unicasts in transmitting contents between the UPnP media devices, which increases a relay peer load and thus causes a transmission delay due to lack of network resources when contents are simultaneously streamed to the UPnP media devices in different UPnP networks.

Multimedia streaming using a virtual media server between UPnP based home networks has been also proposed. However, such multimedia streaming has some disadvantages that a home connector needs to be installed in each home network, setting of the connector for connection between the home networks is performed manually and a dynamic configuration according to movement of users is difficult. Further, since the virtual media server relays streaming data while collecting contents information of other media servers, which results in load concentration.

In order to support mobility of UPnP devices, an SIP (Session Initiation Protocol) based mobility provision has been proposed. However, since each UPnP device needs to support SIP, previously-developed UPnP devices need to be redeveloped to apply such mobility provision thereto. Further, such mobility provision fails to provide simultaneous and secure multicasting of contents to UPnP media devices in different UPnP networks.

SUMMARY OF THE INVENTION

In view of the above, the present invention provides a method and apparatus for securely multicasting contents between general-purpose network devices in different home networks connected to the Internet.

In accordance with an aspect of the present invention, there is provided an apparatus for multicasting contents between devices in different networks, the apparatus including:

a home-to-home multicast control device for finding the devices in the networks, downloading contents from a device in a network to which the home-to-home multicast control device belongs, processing the contents to generate file blocks, each file block having chunk files, and multicasting the processed contents to the devices in the networks;

at least one home-to-home multicast bridge device for receiving the contents transmitted from the home-to-home multicast control device and streaming the contents to one or more devices in a network to which the home-to-home multicast bridge device belongs; and a multicast relay device for relaying the contents between the home-to-home multicast control device and the home-to-home multicast bridge device.

Preferably, the home-to-home multicast control device includes: a security management unit for managing an authentication key and an electronic signature; an access management unit for establishing a connection with the multicast relay device to find the home-to-home multicast bridge device and receiving state information of the devices in the network to which the home-to-home multicast bridge device belongs; and a transmission management unit for downloading the contents from the device in the network to which the home-to-home multicast control device belongs and transmitting the contents to the home-to-home multicast bridge device.

Preferably, the security management unit includes: an authentication key management unit for generating, as the authentication key, a public key and a secrete key; an electronic signature generation processor for generating the electronic signature; and a connection processor for exchanging the public key with that of the home-to-home multicast bridge device and managing the public key of the home-to-home multicast bridge device.

Preferably, the access management unit includes: an access processor for finding the multicast relay device and establishing the connection with the multicast relay device; and a device management unit for finding the device in the network to which the home-to-home multicast control device belongs and the devices in the network to which the home-to-home multicast bridge device belongs, and receiving the state information of thus found devices.

Preferably, the transmission management unit includes: a download processor for downloading the contents stored in the device in the network to which the home-to-home multicast control device belongs; a chunk file generation processor for processing the downloaded contents to generate the file blocks and the chunk files; and a chunk file distribution processor for transmitting the chunk files to the home-to-home multicast bridge device.

Preferably, the chunk file generation processor generates one file block upon receipt of a specific amount of data during reception of the contents, and divides the file block into the chunk files of a number corresponding to the number of home-to-home multicast bridge devices to which the contents are to be transmitted.

Preferably, the home-to-home multicast bridge device includes: a security management unit for managing an authentication key and verifying an electronic signature of the home-to-home multicast control device; an access management unit for establishing a connection with the multicast relay device to connect the home-to-home multicast control device and managing state information of the devices in the network to which the home-to-home multicast bridge device belongs; and a transmission management unit for receiving the contents transmitted from the home-to-home multicast control device or other home-to-home multicast bridge device to stream the contents to the network devices in the network to which the home-to-home multicast bridge device belongs or forward the contents data to a designated home-to-home multicast bridge device.

Preferably, the security management unit includes: an authentication key management unit for generating, as the authentication key, a public key and a secrete key; a connection processor for exchanging the public key with that of the home-to-home multicast control device and managing the public key of the home-to-home multicast control device; and an electronic signature verification processor for verifying, by using the public key of the home-to-home multicast control device, the electronic signature contained in an authentication request message from the home-to-home multicast control device.

Preferably, the access management unit includes: an access processor for finding the multicast relay device and establishing the connection with the multicast relay device to find the home-to-home multicast control device; and a device management unit for finding the devices in the network to which the home-to-home multicast bridge device belongs and transmitting the state information of thus found devices to the home-to-home multicast control device.

Preferably, the transmission management unit includes: a chunk file reception processor for receiving the chunk files transmitted from the home-to-home multicast control device or other home-to-home multicast bridge device; a streaming data transmitter for checking whether the chunk file reception processor receives all chunk files forming one file block and streaming the file block to a designated one of the devices in the network to which the home-to-home multicast bridge device belongs; and a chunk file forwarding processor for forwarding the chunk files to the designated home-to-home multicast bridge device, if the chunk files received by the chunk file reception processor are transmitted from the home-to-home multicast control devices.

In accordance with another aspect of the present invention, there is provided a method for multicasting contents between devices in different networks having a home-to-home multicast control device, at least one home-to-home multicast bridge device and a multicast relay device, the method including:

transmitting, at the home-to-home multicast control device, contents stored in a device in a network to which the home-to-home multicast control device belongs to the devices in the networks;

relaying, at the multicast relay device, the contents between the home-to-home multicast control device and the home-to-home multicast bridge device; and streaming, at the home-to-home multicast bridge device, the contents transmitted from the home-to-home multicast control device to one or more devices in a network to which the home-to-home multicast bridge device belongs.

Preferably, said transmitting the contents includes: generating, as an authentication key, a public key and a secrete key; exchanging the public key with that of the home-to-home multicast bridge device; generating an electronic signature by using the secret key; transmitting an authentication request message containing the electronic signature to the home-to-home multicast bridge device; receiving state information of the devices in the network to which the home-to-home multicast bridge device; downloading the contents from the device in the network to which the home-to-home multicast control device belongs; processing the downloaded contents to generate file blocks having chunk files; and transmitting chunk file transmission messages containing the chunk files to the home-to-home multicast bridge device.

Preferably, in said processing the downloaded contents, one file block is generated upon receipt of a specific amount of data during reception of the contents, and divides the file block into the chunk files of a number corresponding to the number of home-to-home multicast bridge devices to which the contents are to be transmitted.

Preferably, in said processing the downloaded contents, the chunk files are encrypted by using the public key of the home-to-home multicast bridge device.

Preferably, each of the chunk file massages includes at least one of a chunk identification number, a block identification number, a file block size, a chunk file size, the entire number of chunk files contained in a block, a chunk transmission start time, a list of the home-to-home multicast bridge devices to which the chunk file is to be transmitted and chunk file data.

Preferably, in said transmitting the contents, after transmitting the chunk files contained in one file block to the home-to-home multicast bridge device, a next file block is sequentially transmitted to the home-to-home multicast bridge device until all file blocks forming the entire contents are transmitted.

Preferably, said streaming the contents includes: generating, as an authentication key, a public key and a secrete key; exchanging the public key with that of the home-to-home multicast control device; verifying, by using the public key of the home-to-home multicast control device, the electronic signature contained in an authentication request message from the home-to-home multicast control device; transmitting to the home-to-home multicast control device state information of the devices in the network to which the home-to-home multicast bridge device belongs; establishing a security communication channel with the home-to-home multicast control device; receiving the chunk file transmission messages transmitted from the home-to-home multicast control device or other home-to-home multicast bridge device to store the chunk files contained in the chunk file transmission messages; combining, if all chunk files contained in one file block are received, the received chunk files to reassemble the file block; and streaming the reassembled file block to designated devices.

Preferably, said streaming the contents includes: forwarding the received chunk file transmission messages to a designated home-to-home multicast bridge device if the received chunk file transmission messages are transmitted from the home-to-home multicast control device.

Preferably, in said combining the received chunk file transmission messages, the chunk file transmission messages are decrypted by using the secret key.

Preferably, in said streaming the reassembled file block, after transmitting one file block to the device, a next file block is sequentially transmitted to the device until all file blocks forming the entire contents are transmitted.

According to the present invention, concurrent streaming transmission, i.e., multicast streaming, on contents to multiple UPnP devices in different general-purpose networks can be performed with much less network resources compared to a conventional streaming method using multiple unicasts. Further, security of contents transmitted between UPnP devices in different home networks can be ensured.

BRIEF DESCRIPTION OF THE DRAWINGS

The above features of the present invention will become apparent from the following description of embodiments, given in conjunction with the accompanying drawings, in which:

FIG. 4 illustrates a flowchart of a method for multicasting contents performed by the apparatus of FIG. 1;

FIG. 5 illustrates a detailed flowchart of the step S810 in the method of FIG. 4.

DETAILED DESCRIPTION OF THE EMBODIMENTS

Hereinafter, embodiments of the present invention will be described in detail with reference to the accompanying drawings, which form a part hereof.

Figure 1:
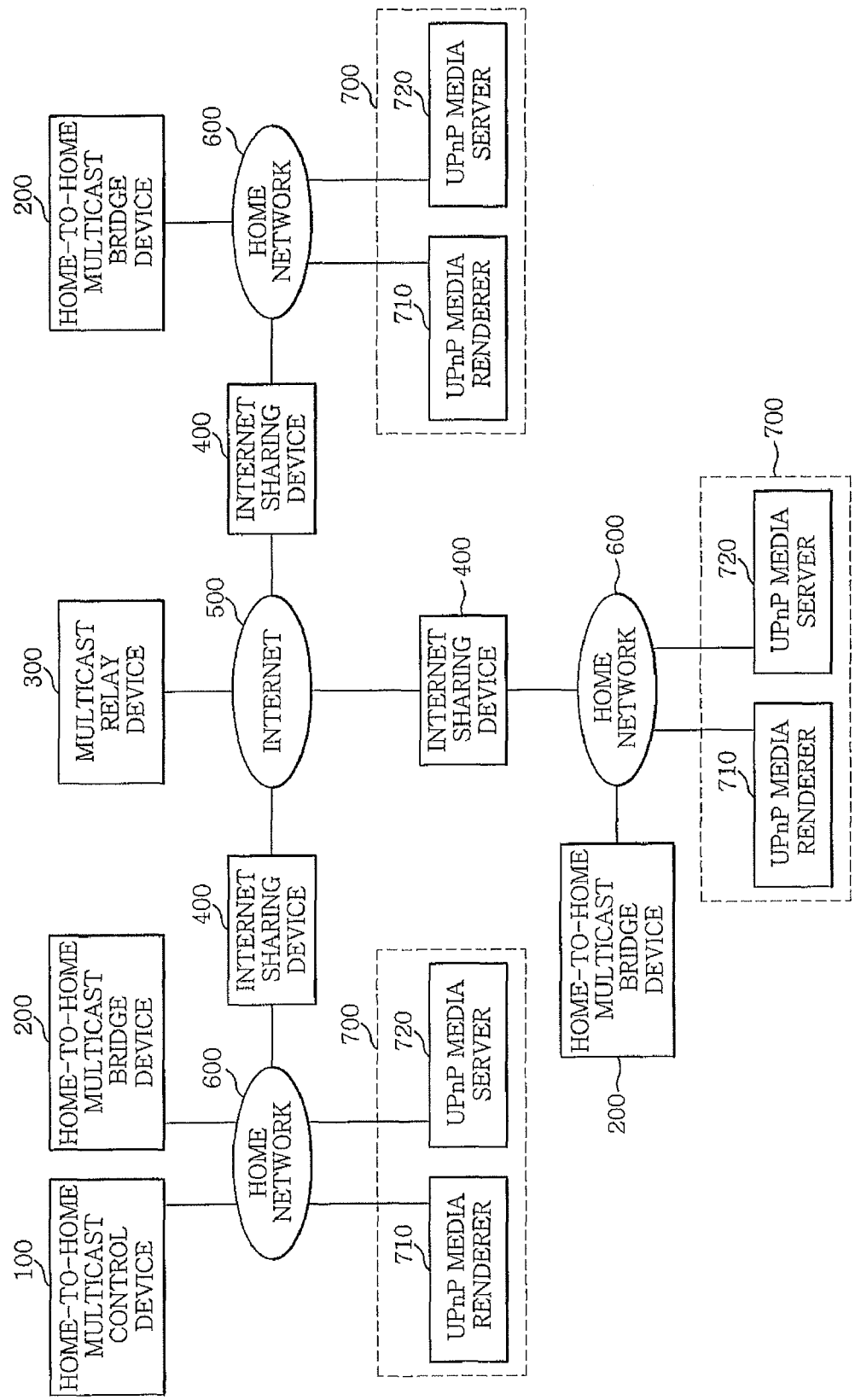
FIG. 1 illustrates a block diagram of an apparatus for multicasting contents between devices in networks in accordance with an embodiment of the present invention.

FIG. 1 illustrates a block diagram of an apparatus for multicasting contents between devices in networks in accordance with an embodiment of the present invention.

Referring to FIG. 1, the apparatus may include a home-to-home multicast control device 100, home-to-home multicast bridge devices 200 and a multicast relay device 300.

The apparatus securely multicasts multimedia contents between general-purpose network devices 700 in different home networks 600 connected to the Internet 500 via Internet sharing devices 400 performing network address conversion. It should be noted that each home network 600 may have one or more general-purpose network devices 700. Each of the general-purpose network devices 700 may have a UPnP media renderer 710 and a UPnP media server 720.

The home-to-home multicast control device 100 finds the general-purpose network devices 700 in the home networks 600, and downloads multimedia contents stored in the UPnP media server 720 of the general-purpose network device 700 in the home network 600 to which the home-to-home multicast control device 100 belongs. The home-to-home multicast control device 100 then processes the downloaded contents to generate file blocks having chunk files, and multicasts the processed contents along with control messages to the home-to-home multicast bridge devices 200 via the multicast relay device 300.

The multicast relay device 300 relays the control messages and contents between the home-to-home multicast control device 100 and the home-to-home multicast bridge devices 200.

Each home-to-home multicast bridge device 200 receives the control messages and multimedia contents, and streaming the received control messages and multimedia contents to the UPnP media renderers 710 of the general-purpose network devices 700 in the home networks 600 to which the home-to-home multicast bridge devices 200 belongs.

Figure 2:
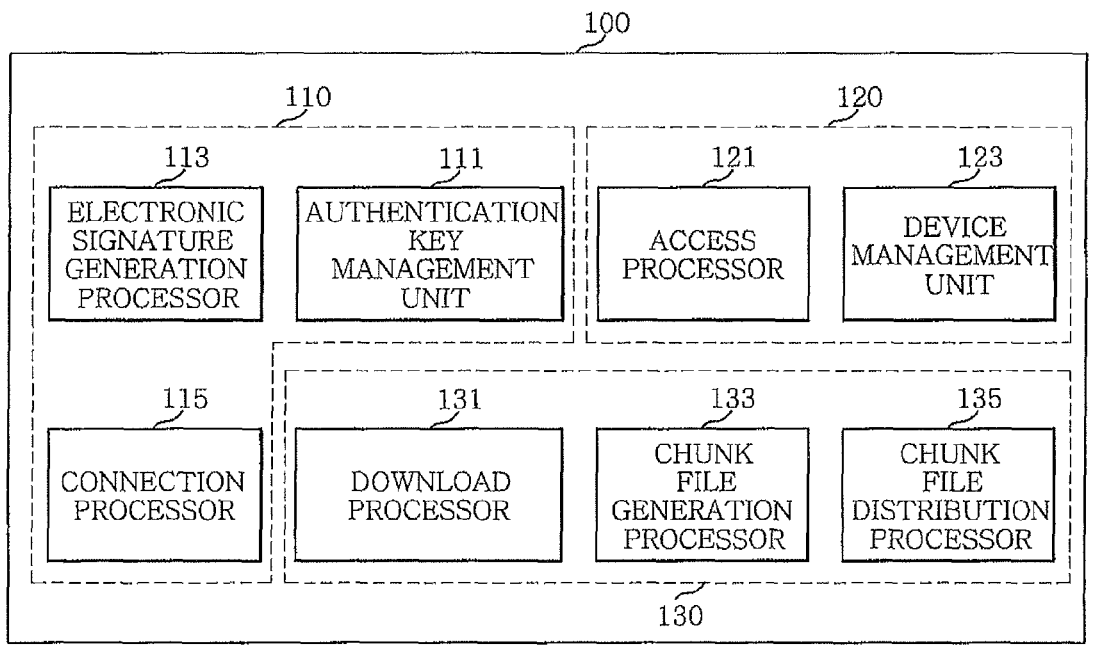
FIG. 2 illustrates a block diagram of the home-to-home multicast control device in the apparatus of FIG. 1.

FIG. 2 illustrates a block diagram of the home-to-home multicast control device 100 in the apparatus of FIG. 1.

Referring to FIG. 2, the home-to-home multicast control device 100 may include a security management unit 110, an access management unit 120 and a transmission management unit 130.

The security management unit 110 manages an authentication key and an electronic signature for use in secure communications with the home-to-home multicast bridge devices 200.

The security management unit 110 has an authentication key management unit 111 for generating and managing a public key and a secrete key, as the authentication keys for use in connection requests to the home-to-home multicast bridge devices 200 and transmission of encrypted data thereto; an electronic signature generation processor 113 for generating the electronic signature for use in secure communication channel requests, along with the secret keys, to the home-to-home multicast bridge devices 200; and a connection processor 115 for exchanging the public key with those of the home-to-home multicast bridge devices 200 and managing thus exchanged public keys.

The access management unit 120 establishes via the Internet 500 a connection with the multicast relay device 300 in order for connection with the home-to-home multicast bridge devices 200, and manages states of the general-purpose network devices 700.

The access management unit 120 has an access processor 121 for finding the multicast relay device 300 and establishing the connection with the multicast relay device 300; and a device management unit 123 for finding, upon establishment of the connection with the home-to-home multicast bridge devices 200, the general-purpose network devices 700 in the home networks 600 and managing the states of thus found general-purpose network devices 700.

The transmission management unit 130 downloads multimedia contents stored in the UPnP media server 720 of the general-purpose network device 700 in the home network 600 to which the home-to-home multicast control device 100 belongs, and transmits thus downloaded multimedia contents to the home-to-home multicast bridge devices 200.

The transmission management unit 130 has a download processor 131 for downloading the multimedia contents stored in the UPnP media server 720 of the general-purpose network device 700 in the home network 600 to which the home-to-home multicast control device 100 belongs; a chunk file generation processor 133 for processing the multimedia contents downloaded by the download processor 131 to generate file blocks and chunk files; and a chunk file distribution processor 135 for transmitting thus generated chunk files to the home-to-home multicast bridge devices.

Figure 3:
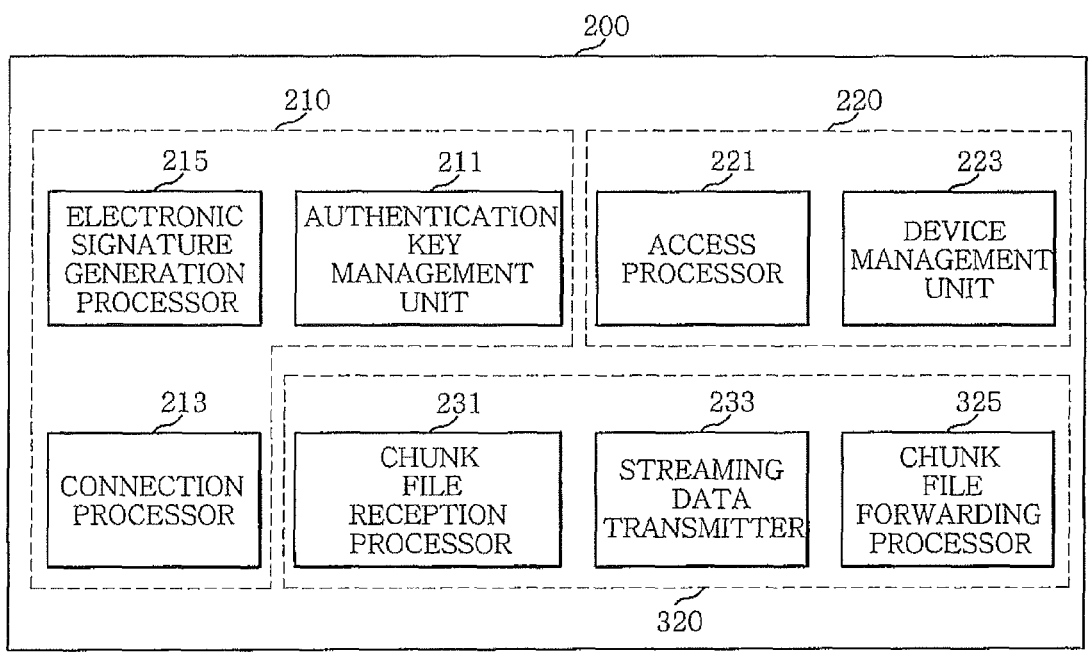
FIG. 3 illustrates a block diagram of each home-to-home multicast bridge device in the apparatus of FIG. 1.

FIG. 3 illustrates a block diagram of each home-to-home multicast bridge device 200 in the apparatus of FIG. 1.

Referring to FIG. 3, each home-to-home multicast bridge device 200 may include a security management unit 210, an access management unit 220 and a transmission management unit 230.

The security management unit 210 manages an authentication key and verifies the electronic signature for use in secure communications with the home-to-home multicast control device 100.

This security management unit 210 has an authentication key management unit 211 for generating and managing a public key and a secrete key, as the authentication keys for use in encryption/decryption of transmission messages and verification of authentication messages received from the home-to-home multicast control device 100; a connection processor 213 for exchanging the public key with that of the home-to-home multicast control device 100 in the home network 600 to which the home-to-home multicast bridge device 200 belongs and managing the public key; and an electronic signature verification processor 215 for verifying the electronic signature contained in an authentication request message from the home-to-home multicast control device 100 by using thus exchanged public key.

The access management unit 220 establishes a connection with the multicast relay device 300 in order for finding the home-to-home multicast control device 100, and manages states of the general-purpose network devices 700 in the home network 600 to which the home-to-home multicast bridge device 200 belongs.

The access management unit 220 has an access processor 221 for finding the multicast relay device 300 and establishing a connection with the multicast relay device 300; and a device management unit 223 for finding the general-purpose network devices 700 in the home network 600 to which the home-to-home multicast bridge device 200 belongs and transmitting information on the states of thus found general-purpose network devices 700 to the home-to-home multicast control device 100 connected to the home-to-home multicast bridge device 200.

The transmission management unit 230 receives multimedia contents from the home-to-home multicast control device 100 or other home-to-home multicast bridge device 200, and streams thus received multimedia contents to the UPnP media renderers 710 of the general-purpose network devices 700 in the home network 600 to which the home-to-home multicast bridge device 200 belongs. Further, the transmission management unit 230 may forwards the multimedia contents to designated home-to-home multicast bridge devices 200.

The transmission management unit 230 has a chunk file reception processor 231 for receiving the chunk files transmitted from the home-to-home multicast control device 100 or other home-to-home multicast bridge device 200; a streaming data transmitter 233 for checking whether all chunk files forming one file block are received by the chunk file reception processor 231 and streaming the file block to designated general-purpose network devices 700; and a chunk file forwarding processor 235 for forwarding the chunk files to a designated home-to-home multicast bridge device 200 if the chunk files received by the chunk file reception processor 231 are transmitted from the home-to-home multicast control device 100.

Below, a method for multicasting contents between devices in networks in accordance with the present invention will be described with reference to FIGS. 4 to 6.

FIG. 4 illustrates a flowchart of a method for multicasting contents performed by the apparatus of FIG. 1.

First, a home-to-home multicast control device 100 finds general-purpose network devices 700 in home networks 600, downloads contents stored in a general-purpose network device 700 in a home network 600 to which the home-to-home multicast control device 100 belongs, processes the contents to generate file blocks having chunk files, and transmits thus processed contents along with control messages (step S810). A multicast relay device 300 relays the control messages and contents transmitted from the home-to-home multicast control device 100 (step S820). A home-to-home multicast bridge device 200 receives the control messages and contents from the multicast relay device 300, and streams the contents to general-purpose network devices 700 in a home network 600 to which the home-to-home multicast bridge device 200 belongs (step S830).

FIG. 5 illustrates a detailed flowchart of the step S810 in the method of FIG. 4.

In the home-to-home multicast control device 100, the authentication key management unit 111 generates a public key and a secret key, as an authentication key for use in message encryption and mutual authentication with the home-to-home multicast bridge devices 200, and the connection processor 115 exchanges the public key with those of the home-to-home multicast bridge devices 200 (step S811).

The electronic signature generation processor 113 generates, by using the secrete key, an electronic signature for use in a secure communication channel request to the home-to-home multicast bridge devices 200, and in order for connection with the home-to-home multicast bridge devices 200, the access processor 121 transmits, to the home-to-home multicast bridge devices 200, an authentication request message containing the electronic signature (step S812).

Upon completion of authentication, the device management unit 123 finds general-purpose network devices 700 in the home network 600 to which the home-to-home multicast control device 100 belongs and in other home networks 600, and receives information on states of thus found general-purpose network devices 700 from the home-to-home multicast bridge devices 200 (step S813).

The download processor 131 downloads multimedia contents stored in the UPnP media server 720 of the general-purpose network device 700 in the home network 600 to which the home-to-home multicast control device 100 belongs (step S814).

The chunk file generation processor 133 generates a file block when it receives a specific amount of data during reception of the multimedia contents, and processes the file block to generate chunk files of a number corresponding to the number of the home-to-home multicast bridge devices 200 to which the file block is to be transmitted. At this time, the chunk file generation processor 133 encrypts the chunk files by using public keys received from the home-to-home multicast bridge devices 200 in the step S811 (step S815).

The chunk file distribution processor 135 transmits chunk file transmission messages containing the chunk files to the home-to-home multicast bridge devices 200. Here, the chunk file transmission message may include at least one of a chunk identification number, a block identification number, a file block size, a chunk file size, the entire number of chunk files contained in a block, a chunk transmission start time, a list of the home-to-home multicast bridge devices to which the contents is to be transmitted and chunk file data (step S816).

When completing transmission of all chunk files contained in the file block to the home-to-home multicast bridge devices 200, a next file block is sequentially transmitted to the home-to-home multicast bridge devices 200 until all file blocks forming the entire contents are transmitted. That is, the steps S814 to S816 are repeated.

Figure 6:
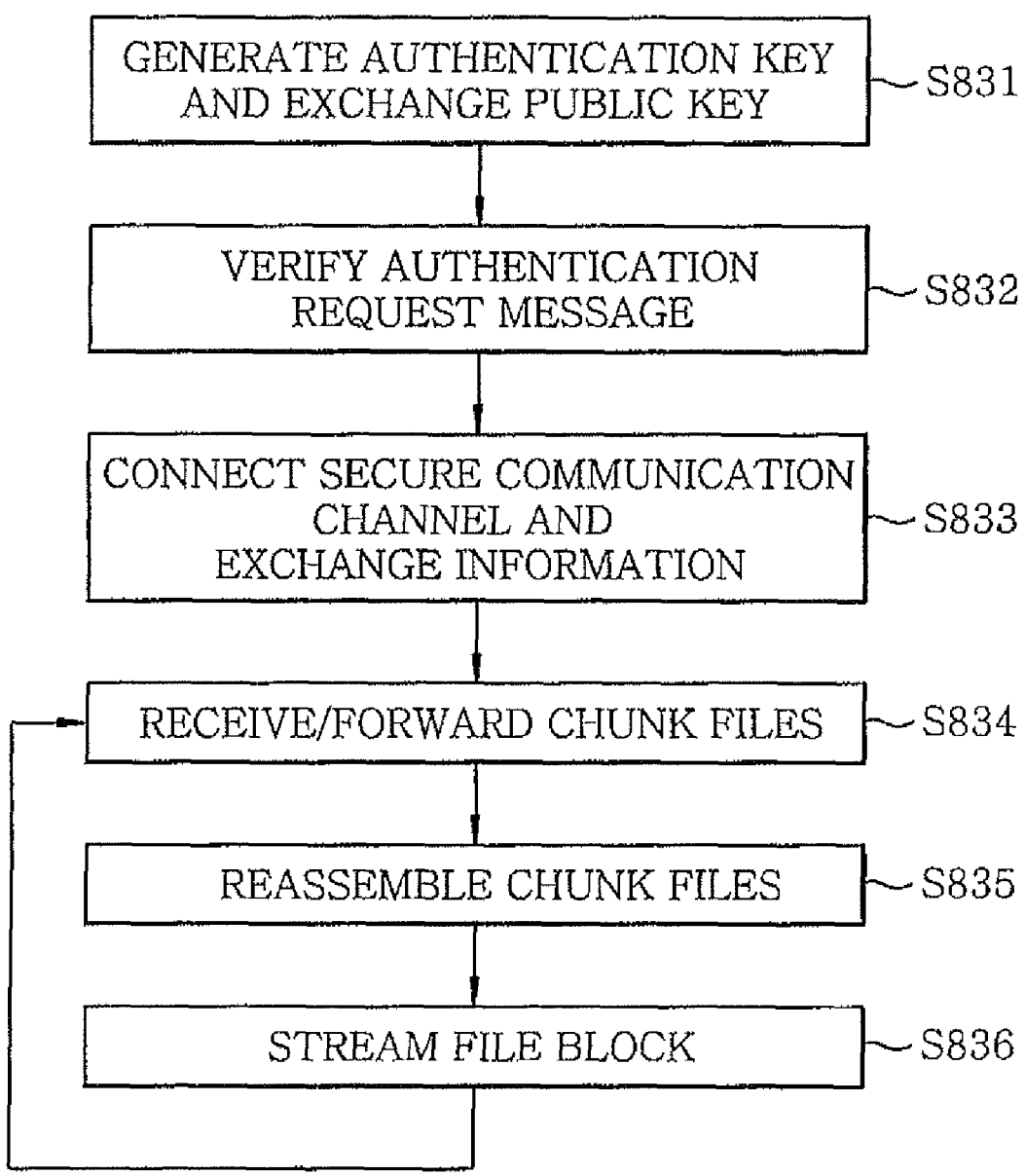
FIG. 6 illustrates a detailed flowchart of the step S830 in the method of FIG. 4.

FIG. 6 illustrates a detailed flowchart of the step S830 in the method of FIG. 4.

In each home-to-home multicast bridge devices 200, the authentication key management unit 211 generates a public key and a secrete key, as an authentication key for use in message encryption and mutual authentication with the home-to-home multicast control device 100, and the connection processor 213 exchanges the public key with that of the home-to-home multicast control device 100 (step S831).

The electronic signature verification processor 215 verifies the authentication request message, containing the electronic signature of the home-to-home multicast control device 100, received from the home-to-home multicast control device 100 (step S832).

Upon completion of the verification, the access processor 221 finds the multicast relay device 300 and establishes a connection with the home-to-home multicast control device 100. The device management unit 223 generates a secure communication channel with the home-to-home multicast control device 100 and transmits, to the home-to-home multicast control device 100, information on states of general-purpose network devices 700 in a home network 600 to which the home-to-home multicast bridge device 200 belongs (step S833).

The chunk file reception processor 231 receives the chunk file transmission message from the home-to-home multicast control device 100 or from other home-to-home multicast bridge device 200 via the secure communication channel, and stores the chunk files contained in the message. At this time, if the chunk file transmission message is transmitted from the home-to-home multicast control device 100, the chunk file forwarding processor 235 forwards the message to designated home-to-home multicast bridge devices 200 (step S834).

Upon reception of all chunk files contained in one file block, the chunk file reception processor 231 combines the chunk files to reassemble the file block (step S835). At this time, the encrypted chunk files are decrypted by using the secret key.

The streaming data transmitter 233 streams thus reassembled file block to the UPnP media renderers 710 of designated general-purpose network devices 700 (step S836).

When completing transmission of one file block to the general-purpose network device 700, the streaming data transmitter 233 sequentially transmits a next file block to the general-purpose network devices 700 until all file blocks forming the entire contents are transmitted. That is, the steps S834 to S836 are repeated.

The above-described multicasting method may be written in computer programs. Codes and code segments constituting the computer programs can be easily deduced by computer programmers skilled in the art. In addition, the programs are stored in a computer-readable storage medium, read and executed by computers, thereby implementing the multicasting method. Examples of the computer-readable storage medium include a magnetic recording medium, an optical recording medium and a carrier wave medium.

While the invention has been shown and described with respect to the embodiments, it will be understood by those skilled in the art that various changes and modification may be made without departing from the scope of the invention as defined in the following claims.

What is claimed is:

1. An apparatus for multicasting contents between devices in different networks, the apparatus comprising:
    a home-to-home multicast control device for finding the devices in the networks, downloading contents from a device in a network to which the home-to-home multicast control device belongs, processing the contents to generate file blocks, each file block having chunk files, and multicasting the processed contents to the devices in the networks;
    at least one home-to-home multicast bridge device for receiving the contents transmitted from the home-to-home multicast control device and streaming the contents to one or more devices in a network to which the home-to-home multicast bridge device belongs; and
    a multicast relay device for relaying the contents between the home-to-home multicast control device and the home-to-home multicast bridge device,
    wherein the home-to-home multicast control device includes:
    a security management unit for managing an authentication key and an electronic signature;
    an access management unit for establishing a connection with the multicast relay device to find the home-to-home multicast bridge device and receiving state information of the devices in the network to which the home-to-home multicast bridge device belongs; and
    a transmission management unit for downloading the contents from the device in the network to which the home-to-home multicast control device belongs and transmitting the contents to the home-to-home multicast bridge device.

2. The apparatus of claim 1, wherein the security management unit includes:
    an authentication key management unit for generating, as the authentication key, a public key and a secrete key;
    an electronic signature generation processor for generating the electronic signature; and
    a connection processor for exchanging the public key with that of the home-to-home multicast bridge device and managing the public key of the home-to-home multicast bridge device.

3. The apparatus of claim 1, wherein the access management unit includes:
    an access processor for finding the multicast relay device and establishing the connection with the multicast relay device; and
    a device management unit for finding the device in the network to which the home-to-home multicast control device belongs and the devices in the network to which the home-to-home multicast bridge device belongs, and receiving the state information of thus found devices.

4. The apparatus of claim 1, wherein the transmission management unit includes:
    a download processor for downloading the contents stored in the device in the network to which the home-to-home multicast control device belongs;
    a chunk file generation processor for processing the downloaded contents to generate the file blocks and the chunk files; and
    a chunk file distribution processor for transmitting the chunk files to the home-to-home multicast bridge device.

5. The apparatus of claim 4, wherein the chunk file generation processor generates one file block upon receipt of a specific amount of data during reception of the contents, and divides the file block into the chunk files of a number corresponding to the number of home-to-home multicast bridge devices to which the contents are to be transmitted.

6. The apparatus of claim 1, wherein the home-to-home multicast bridge device includes:
    a security management unit for managing an authentication key and verifying an electronic signature of the home-to-home multicast control device;
    an access management unit for establishing a connection with the multicast relay device to connect the home-to-home multicast control device and managing state information of the devices in the network to which the home-to-home multicast bridge device belongs; and
    a transmission management unit for receiving the contents transmitted from the home-to-home multicast control device or other home-to-home multicast bridge device to stream the contents to the network devices in the network to which the home-to-home multicast bridge device belongs or forward the contents data to a designated home-to-home multicast bridge device.

7. The apparatus of claim 6, wherein the security management unit includes:
    an authentication key management unit for generating, as the authentication key, a public key and a secrete key;
    a connection processor for exchanging the public key with that of the home-to-home multicast control device and managing the public key of the home-to-home multicast control device; and
    an electronic signature verification processor for verifying, by using the public key of the home-to-home multicast control device, the electronic signature contained in an authentication request message from the home-to-home multicast control device.

8. The apparatus of claim 6, wherein the access management unit includes:
an access processor for finding the multicast relay device and establishing the connection with the multicast relay device to find the home-to-home multicast control device; and
a device management unit for finding the devices in the network to which the home-to-home multicast bridge device belongs and transmitting the state information of thus found devices to the home-to-home multicast control device.

9. The apparatus of claim 6, wherein the transmission management unit includes:
a chunk file reception processor for receiving the chunk files transmitted from the home-to-home multicast control device or other home-to-home multicast bridge device;
a streaming data transmitter for checking whether the chunk file reception processor receives all chunk files forming one file block and streaming the file block to a designated one of the devices in the network to which the home-to-home multicast bridge device belongs; and
a chunk file forwarding processor for forwarding the chunk files to the designated home-to-home multicast bridge device, if the chunk files received by the chunk file reception processor are transmitted from the home-to-home multicast control devices.

10. A method for multicasting contents between devices in different networks having a home-to-home multicast control device, at least one home-to-home multicast bridge device and a multicast relay device, the method comprising:
transmitting, at the home-to-home multicast control device, contents stored in a device in a network to which the home-to-home multicast control device belongs to the devices in the networks;
relaying, at the multicast relay device, the contents between the home-to-home multicast control device and the home-to-home multicast bridge device; and
streaming, at the home-to-home multicast bridge device, the contents transmitted from the home-to-home multicast control device to one or more devices in a network to which the home-to-home multicast bridge device belongs,
wherein said transmitting the contents includes:
generating, as an authentication key, a public key and a secrete key;
exchanging the public key with that of the home-to-home multicast bridge device;
generating an electronic signature by using the secret key;
transmitting an authentication request message containing the electronic signature to the home-to-home multicast bridge device;
receiving state information of the devices in the network to which the home-to-home multicast bridge device belongs;
downloading the contents from the device in the network to which the home-to-home multicast control device belongs;
processing the downloaded contents to generate file blocks having chunk files; and
transmitting chunk file transmission messages containing the chunk files to the home-to-home multicast bridge device.

11. The method of claim 10, wherein, in said processing the downloaded contents, one file block is generated upon receipt of a specific amount of data during reception of the contents, and divides the file block into the chunk files of a number corresponding to the number of home-to-home multicast bridge devices to which the contents are to be transmitted.

12. The method of claim 10, wherein, in said processing the downloaded contents, the chunk files are encrypted by using the public key of the home-to-home multicast bridge device.

13. The method of claim 10, wherein each of the chunk file massages includes at least one of a chunk identification number, a block identification number, a file block size, a chunk file size, the entire number of chunk files contained in a block, a chunk transmission start time, a list of the home-to-home multicast bridge devices to which the chunk file is to be transmitted and chunk file data.

14. The method of claim 10, wherein, in said transmitting the contents, after transmitting the chunk files contained in one file block to the home-to-home multicast bridge device, a next file block is sequentially transmitted to the home-to-home multicast bridge device until all file blocks forming the entire contents are transmitted.

15. The method of claim 10, wherein said streaming the contents includes:
generating, as an authentication key, a public key and a secrete key;
exchanging the public key with that of the home-to-home multicast control device;
verifying, by using the public key of the home-to-home multicast control device, the electronic signature contained in an authentication request message from the home-to-home multicast control device;
transmitting to the home-to-home multicast control device state information of the devices in the network to which the home-to-home multicast bridge device belongs;
establishing a security communication channel with the home-to-home multicast control device;
receiving the chunk file transmission messages transmitted from the home-to-home multicast control device or other home-to-home multicast bridge device to store the chunk files contained in the chunk file transmission messages;
combining, if all chunk files contained in one file block are received, the received chunk files to reassemble the file block; and
streaming the reassembled file block to designated devices.

16. The method of claim 15, wherein said streaming the contents includes:
forwarding the received chunk file transmission messages to a designated home-to-home multicast bridge device if the received chunk file transmission messages are transmitted from the home-to-home multicast control device.

17. The method of claim 15, wherein, in said combining the received chunk file transmission messages, the chunk file transmission messages are decrypted by using the secret key.

18. The method of claim 15, wherein in said streaming the reassembled file block, after transmitting one file block to the device, a next file block is sequentially transmitted to the device until all file blocks forming the entire contents are transmitted.

* * * * *